May 11, 1943. D. L. BABCOCK ET AL 2,319,029
SLIDE CARRIER
Filed Sept. 20, 1940
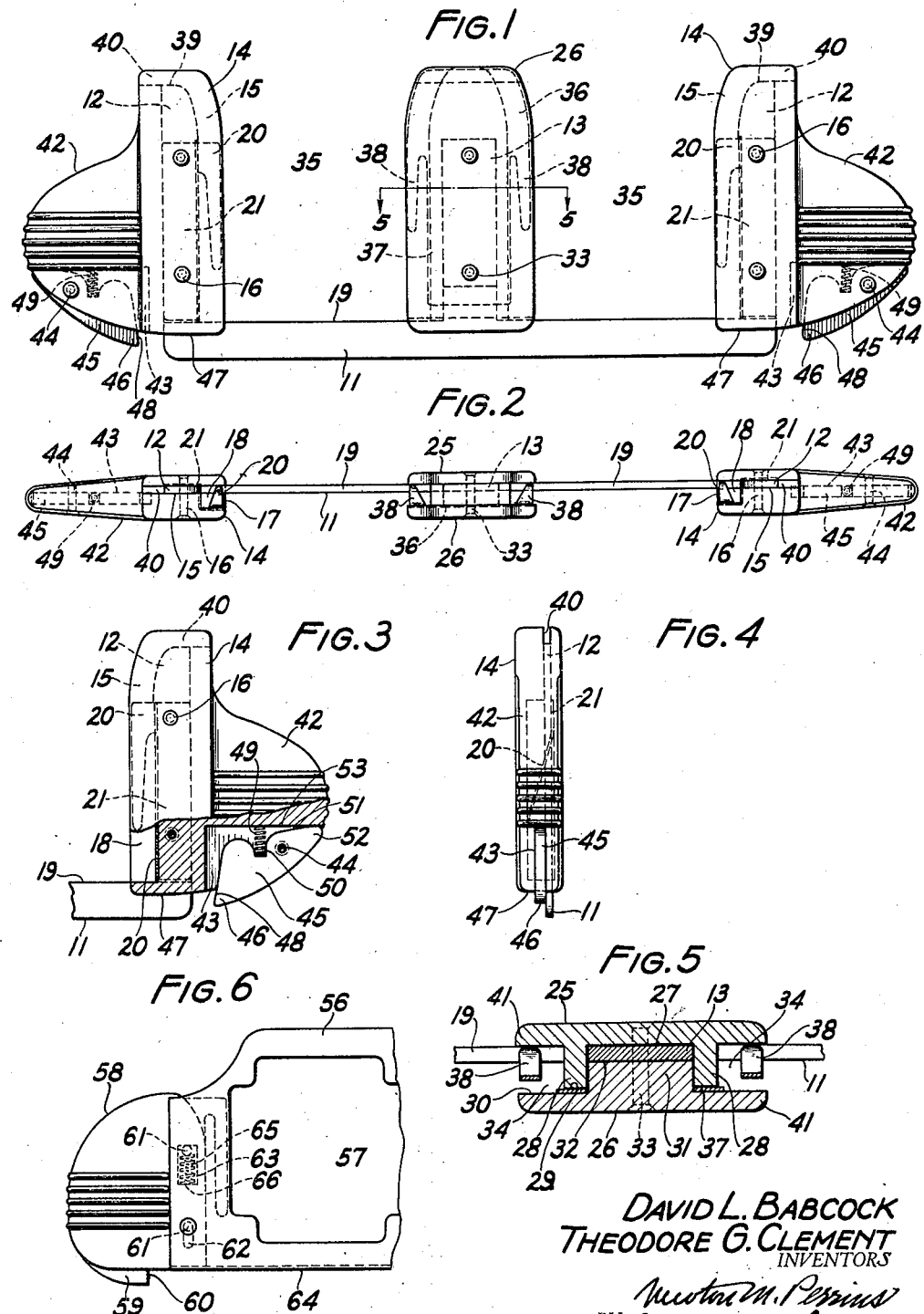
DAVID L. BABCOCK
THEODORE G. CLEMENT
INVENTORS
BY
ATTORNEYS Patented May 11, 1943

2,319,029

UNITED STATES PATENT OFFICE 2,319,029

SLIDE CARRIER

David L. Babcock and Theodore G. Clement, Rochester, N. Y., assignors to Eastman Kodak Company, Rochester, N. Y., a corporation of New Jersey Application September 20, 1940, Serial No. 357,580

10 Claims. (Cl. 88—26)

This invention relates to projectors, and more particularly to a slide carrier for moving image areas into and out of projecting position on said projector.

One object of the invention is the provision on a slide carrier of a stop which, when in one position, serves to limit the movement of the carrier on the projector to properly position the image areas relative thereto, but which may be readily and easily moved to a retracted or inoperative position to permit the mounting of the carrier on or the removal of the carrier from the projector.

Another object of the invention is the provision of a limiting stop which is normally retained in the proper engaging position to afford a positive means for limiting the movement of the carrier relative to the projector.

A further object of the invention is the provision of a novel clamping means for the image area positioning spring.

To these and other ends, the invention resides in certain improvements and combinations of parts, all as will be hereinafter more fully described, the novel features being pointed out in the claims at the end of the specification.

In the drawing:

Fig. 1 is a front elevation view of a slide carrier constructed in accordance with the preferred embodiment of the invention;

Fig. 2 is a top plan view of the carrier illustrated in Fig. 1;

Fig. 3 is a fragmentary view of a portion of the carrier illustrated in Figs. 1 and 2, with parts in section and parts in elevation, showing the preferred method of forming and supporting the limiting stops or lugs;

Fig. 4 is an end view of the carrier illustrated in Figs. 1 and 2, showing the arrangement of the various parts;

Fig. 5 is a horizontal sectional view through the center image supporting member and taken substantially on line 5—5 of Fig. 1, showing the interlocking engagement of the center image area supporting members and also the arrangement for clamping the positioning spring in place; and Fig. 6 is a view of one end of a modified carrier showing the relation and arrangement of the limiting stops or lugs thereon.

Similar reference numerals throughout the various views indicate the same parts.

The slide carrier in the present invention is adapted for use with projectors of any suitable and well-known construction. As such projectors do not constitute a part of the present invention and would not assist in a full understanding thereof, a showing thereof is not made.

The carrier, in its preferred embodiment, is provided with a frame or body portion which is suitably formed from a thin strip of substantially rigid sheet material, such for example, as sheet metal, to provide a longitudinal extending bottom member or runner 11, a pair of end posts 12 and a center post 13 extending upwardly from the bottom 11, as clearly shown in Fig. 1. The bottom member or runner 11 is adapted to engage in a slot, not shown, of a projector so that the carrier may be slid thereon, as will be readily apparent to those in the art.

A pair of end members 14 formed of any suitable material, in the present instance plastic, are provided with thin slots 15 adapted to receive the end posts 12 to which they are rigidly secured by rivets 16, or other suitable fastening means. The inner face 17 of each of the members 14 is formed with a vertically extending slot or channel 18 adapted to receive a side edge of a transparency or image area, not shown, as is apparent. When the image areas are in position in the carrier, the bottoms thereof will rest on and be supported by the top edge 19 of the bottom member 11. Each of the image areas will thus have the bottom thereof resting on the member 11 and one edge positioned in and supported by one of the channels or slots 18. In order to insure that the image areas will be properly positioned so as to be substantially in the plane of and hence supported by the bottom members 11, each channel 18 has positioned therein a spring 20 of the shape best shown in Fig. 1. This spring is adapted to engage one face of the image area to urge the latter into the plane of the member 11 so that the latter may effectively support the area at the bottom thereof and also properly position the area relative to the optical members of the projector. Each of these springs is substantially L-shaped to provide a clamping portion 21 which is positioned in the slot 15 and secured in place therein by the rivets 16.

While the bottom and one side edge of each image area is thus supported, means must obviously be provided for the support of the other, or inner side edges, of the areas. To this end, the center post 13 has secured thereto a pair of interlocking members broadly designated by the numerals 25 and 26 of the shape best shown in Fig. 5. The member 25 extends upwardly along and in engagement with one face 27 of the center post 13 and is formed with a pair of ribs or flanges 28 between which the post 13 is positioned, as clearly shown in Fig. 5. The free ends 29 of the ribs extend toward the face 30 of the plate 26 to retain the latter in spaced relation to the plate 25 in the manner and for the purpose to be presently pointed out. The plate 26 is also provided with a center portion or tongue 31 which extends between the ribs 28 and into engagement with the other face 32 of the center post 13. Rivets 33, or other suitable fastening means, extend through the two members 25 and 26 and the center post 13 to retain the parts in assembled relation.

The spaced plates 25 and 26 project laterally beyond the ribs 28, as shown at 41, Fig. 5, to provide a pair of center slots or channels 34 which are arranged in alignment with the side channels 18, see Fig. 2, and which are adapted to receive and support the other side edges of the image areas, not shown, as is readily apparent. The channels 34 thus cooperate with the channels 18 and the bottom 11 to provide a pair of pockets or compartments 35 adapted to receive a pair of transparencies or image areas, as is clearly apparent to those familiar with the art. A T-shaped member 36 has its shank portion 37 thereof cut away so as to fit over the tongue 31, and is clamped in position between the free ends 29 of the ribs 28 and the face 30 of the plate 26, see Fig. 5. The outwardly extending arms 38 of the T-shaped member 36 are flexible and extend into the channel 34 to provide springs which cooperate with the springs 19 to retain the image areas in the plane of the bottom 11. The plates 25 and 26 may be formed of any suitable material, preferably plastic similar to the end members 14.

As shown in Figs. 1, 3, and 4, the bottom member 11 projects slightly below the bottom edges of the side member 14 and the center plate members 25 and 26 so that the member 11 may be in a position to engage in a suitable shaped slot or recess, not shown, formed in the projector frame. The carrier may thus be slid from side to side in the projector to selectively position one of the corresponding compartments 35 with its contained image area in the path of the projector light rays so that the image may be projected onto a suitable viewing screen, not shown. The top edge 39 of the side members 14 and the plates 25 and 26 are formed with aligned grooves 40 adapted to receive a suitable top guide strip, not shown, positioned in the projector.

A pair of grips or carrier moving members 42 are preferably formed integral with the end members 14. By gripping one of these members 42, the carrier may be slid into the projector to bring the desired image area into projecting position. These grips are preferably of the shape shown in Figs. 1 and 3 and have the lower portions formed with open end slots 43 in which are pivotally mounted at 44 limiting stops or lugs 45. These lugs are preferably offset slightly from the plane of the bottom members 11, as shown in Fig. 4, and have portions 46 which project or protrude below the lower edges 47 of the members 14. These protruding portions are so positioned that when the carrier is slid in the projector, the leading edge 48 of one of the protruding portions 46 will engage the frame of the projector when one of the image areas is in the projecting position to thus limit further movement of the carrier. When the other image area is to be projected, the carrier is slid in the opposite direction, as is well known, until the other stop lug 45 engages the projection frame to limit such sliding and to properly position the other image area. Thus movement of the carrier in either direction is limited by reason of the stops or limiting lugs 45.

A coil spring 49 is positioned in each slot 43 and has one end received in a recess 50 formed in the top edge 51 of each lug 45, and tends to pivot the lugs about the pivot 44 to move or eject the portion 46 out of the slot 43 to the position shown in Figs. 1 and 3 in which it is effective to limit the sliding movement of the carrier. A tail-piece 52 formed on each lug 45 engages the bottom wall 53 of the slot 43 to properly position the protruding portion 46, as clearly shown in Fig. 3. The portions 46 are thus normally maintained in the ejected or protruding position by means of the springs 49. When, however, the carrier is mounted on the projector, the projector frame will engage the leading lug 45 and will move the latter about its pivot 44 to withdraw or retract this lug into its slot 43. When however, the carrier is properly positioned, the retracted lug then snaps out, under the action of the spring 49, to again position the portion 45, as mentioned above. When, on the other hand, the carrier is to be removed from the projector, one of the lugs 45 is grasped and pushed upwardly or retracted into its slot 43. Now when the carrier is slid into the projector, the retracted lug will be ineffective in limiting the movement of the carrier so that the latter may be withdrawn from its retaining slot in the projector. Thus the lugs 45 are normally urged in one direction to properly position the portions 46 thereof so that the latter may afford a stop means to limit the movement of the carrier. When, however, the carrier is to be mounted on or removed from the projector, one of the protruding portions 46 is moved in the opposite direction so as to withdraw or retract the portion into its slot 43 so that it is rendered ineffective in limiting the movement of the carrier.

Fig. 6 shows a modified form of carrier which comprises a body portion 56 formed in any suitable and well-known manner to provide a pair of image receiving pockets 57, only one of which is shown. The ends of this body portion have mounted thereon plastic grips or carrier moving members 58 by which the carrier may be moved from side to side in the projector. Each of these grips is preferably formed with an integral depending lug or stop member 59 the vertical edge 60 of which is arranged to engage the projector frame to limit the movement of the carrier. As the lugs 59 are formed integral with the grips 58, obviously the lugs cannot be moved to an inoperative position, as in the structure shown in Figs. 1 to 3. It is necessary therefore that the grips 58 and the lugs 59 be movable as a unit to render the lugs ineffective. To secure this result, the body portion 56 is provided with a pair of spaced pins 61 which register with and extend into elongated openings or slots 62 and 63 formed in the grips 58, as clearly illustrated in Fig. 6. Upon inspection of the latter figure, it is apparent that this pin-and-slot arrangement will afford a means by which the grips 58 may be moved vertically relative to the body portion 56 to position or retract the lugs into alignment with or above the bottom edge 64 of the body portion 56 to permit the mounting or removal of the carrier from the projector.

A coil spring 65 is positioned in the large slot 63 and has one end engaging the upper pin 61 while the lower end rests on the bottom 66 of the slot or recess 63. This spring normally retains the grip 58 in the position shown in Fig. 6 in which the stop lug 59 is positioned below the bottom 64 of the body portion 56 so as to engage the projector to limit the movement of the carrier. The spring 65 thus tends to move the grip and lug as a unit to position the lug in its operative position, but by moving the lug upwardly the spring is compressed and the lug is retracted to its inoperative position which will permit the ready and easy mounting or removal of the slide carrier on the projector. While only one of these movable grip members 58 have been shown, it is to be understood that a similar grip is movably connected to the opposite end of the body portion.

It is thus apparent from the above description, that the present invention provides a slide carrier which is formed with a pair of stops or position lugs which, when moved to one position, will positively limit the movement of the carrier in either direction. It is also apparent that the stop lugs may be readily and easily moved to a retracted position in which they are rendered ineffective in limiting the carrier movement so as to permit the mounting of the carrier in or the removal thereof from its slot in the projector. These positioning lugs are normally retained in their operative position by means of springs, which can be manually retracted when desired.

While one embodiment of the invention has been disclosed, it is to be understood that the inventive idea may be carried out in a number of ways. This application is therefore not to be limited to the precise details described, but is intended to cover all variations and modifications thereof falling within the scope of the appended claims.

We claim:

1. A slide carrier for use with a projector and comprising, in combination, a body portion adapted to be mounted on said projector and formed to receive an image area, finger gripping members secured to the opposite ends of said body portion for moving the latter on said projector to move said area into and out of projecting position, a lug on each of said members adapted to engage said projector for limiting the sliding movement of said carrier, and means on said carrier for movably mounting said lugs so that the latter may be moved to a retracted position to permit the mounting or removal of said carrier.

2. A slide carrier for use with a projector and comprising, in combination, a body portion adapted to be mounted on said projector and formed to receive an image area, a pair of grips positioned at the opposite ends of said body portion for sliding said carrier on said projector to move said area into and out of projecting position, a positioning lug on each of said grips adapted to engage said projector for limiting the sliding movement of said carrier, and means for movably mounting said grips on said body portion so that said grips may be actuated to retract said lugs to permit the mounting or removal of said carrier.

3. A slide carrier for use with a projector and comprising, in combination, a body portion adapted to be mounted on said projector and formed to receive an image area, a pair of grips positioned at the opposite ends of said body portion for sliding said carrier on said projector to move said area into and out of projecting position, a depending lug formed integral with each of said grips and positioned to normally engage said projector to limit the sliding movement of said carrier, and means for slidably mounting said grips on said body portion whereby said grips may be normaly moved in one direction to retract said lugs to permit the mounting or removal of said carrier.

4. A slide carrier for use with a projector and comprising, in combination, a body portion adapted to be mounted on said projector and formed to receive an image area, a pair of grips positioned at the opposite ends of said body portion for sliding said carrier on said projector to move said area into and out of projecting position, a depending lug formed integral with each of said grips and positioned to normally engage said projector to limit the sliding movement of said carrier, means for slidably mounting said grips on said body portion whereby said grips may be normally moved in one direction to retract said lugs to permit the mounting or removal of said carrier, and a spring engaging each of said grips and tending to automatically move said grips in the opposite direction to return said lugs to operative position in which they are adapted to engage said projector to limit sliding of said carrier.

5. A slide carrier for use with a projector and comprising, in combination, a body portion adapted to be mounted on said projector and formed to receive an image area, a pair of grips positioned at the opposite ends of said body portion for sliding said carrier on said projector to move said area into and out of projecting position, each of said grips being formed with a slot, a member pivotally mounted in each of said slots and having a portion extending below said grip so as to engage said projector to limit the sliding movement of said carrier, said members being movable in one direction about said pivots so as to retract said portions into said slots to permit the mounting or removal of said carrier, and a spring positioned in each of said slots and engaging said member to eject said portions from said slots to render said portions effective to limit the sliding of said carrier on said projector.

6. A slide carrier for use with a projector and comprising, in combination, a body portion adapted to be mounted on said projector and formed to receive an image area, a pair of grips positioned at the opposite ends of said body portion for sliding said carrier on said projector to move said area into and out of projecting position, each of said grips being formed with a slot, a member pivotally mounted in each of said slots and having a portion extending below said grip and adapted to engage said projector to limit the sliding movement of said carrier, said members being movable in one direction about said pivots so as to retract said portions into said slots to permit the mounting or removal of said carrier, a spring positioned in each of said slots and engaging said member to eject said portions from said slots to render said portions effective to limit the sliding of said carrier on said projector, and cooperating surfaces on said grips and said members for limiting the ejecting movement of said members.

7. A slide carrier intended for use with a projector and comprising a frame member formed from a strip of substantially rigid sheet material to provide a thin bottom supporting member adapted to slidably engage said projector and a pair of end posts and a center post extending upwardly from said bottom member and in the plane thereof, a pair of interlocking members secured to said center posts and formed with pairs of spaced portions projecting laterally therefrom to provide a pair of slots adapted to receive side edges of an adjacent pair of image areas, springs positioned in said slots and having a part thereof clamped between said interlocking members, a pair of end members secured to said end posts and formed with slots in alignment with said first mentioned slots and adapted to receive the other side edges of said areas, said slots cooperating with said bottom member to provide area receiving pockets, springs positioned in said second slots and cooperating with said first springs to maintain said areas substantially in the plane of said bottom member, and means for clamping said second springs to said end members.

8. A slide carrier intended for use with a projector and comprising a frame member formed from a strip of substantially rigid sheet material to provide a thin bottom supporting member adapted to slidably engage said projector and a pair of end posts and a center post extending upwardly from said bottom member and in the plane thereof, a pair of interlocking plates secured to the opposite faces of said center post and formed with pairs of spaced laterally extending parts which form channels arranged to receive side edges of image areas positioned in said carrier, end members secured to said end posts and formed with slots positioned in alignment with said channels and adapted to receive the other side edges of said areas, springs positioned in said channels and slots for maintaining said areas substantially in the plane of said bottom member, and means on said end members arranged to engage said projector to limit the sliding movement of said carrier in said projector.

9. A slide carrier intended for use with a projector and comprising a frame member formed from a strip of substantially rigid sheet material to provide a thin bottom supporting member adapted to slidably engage said projector and a pair of end posts and a center post extending upwardly from said bottom member and in the plane thereof, a plate positioned on one side of said center post and formed with a pair of vertically extending flanges between which said center post is positioned, a second plate spaced from said first plate and engaging the free ends of said flanges and having a portion extending therebetween and into engagement with the other face of said center post, said plates extending laterally on each side of said flanges to form a pair of center channels adapted to engage adjacent side edges of a pair of image areas positioned in said carrier, a pair of end members formed with slots adapted to receive said end posts, said end members being formed with end channels arranged in alignment with said center channels and adapted to receive the other side edges of said pair of image areas, springs positioned in each of said channels and adapted to engage a face of each of said areas to position the latter substantially in the plane of said bottom member, and means formed on said end members for sliding said carrier on said projector.

10. A slide carrier intended for use with a projector and comprising a frame member formed from a strip of substantially rigid sheet material to provide a thin bottom supporting member adapted to slidably engage said projector and a pair of end posts and a center post extending upwardly from said bottom member and in the plane thereof, a plate positioned on one side of said center post and formed with a pair of vertically extending flanges between which said center post is positioned, a second plate spaced from said first plate and engaging the free ends of said flanges and having a portion extending therebetween and into engagement with the other face of said center post, said plates extending laterally on each side of said flanges to form a pair of center channels adapted to engage adjacent side edges of a pair of image areas positioned in said carrier, a pair of end members formed with slots adapted to receive said end posts, said end members being formed with end channels arranged in alignment with said center channels and adapted to receive the other side edges of said pair of image areas, springs positioned in each of said channels and adapted to engage a face of each of said areas to position the latter substantially in the plane of said bottom member, means formed on said end members for sliding said carrier on said projector, a protuberance carried by each of said members and adapted to engage said projector to limit the movement of said carrier and to position one of said areas in projecting position, and means on said end members for movably mounting said protuberance thereon so that the latter may be moved to a retracted position to permit the positioning of said carrier on or the removal thereof from said projector.

DAVID L. BABCOCK.
THEODORE G. CLEMENT.